United States Patent
Patil et al.

(10) Patent No.: US 10,133,285 B2
(45) Date of Patent: Nov. 20, 2018

(54) VOLTAGE DROOP CONTROL

(71) Applicant: QUALCOMM Incorporated, San Diego, CA (US)

(72) Inventors: Sanjay Bhagawan Patil, Austin, TX (US); Daniel Stasiak, Austin, TX (US); Martin Pierre Saint-Laurent, Austin, TX (US); Rui Li, San Diego, CA (US); Bin Liang, San Diego, CA (US); Sei Seung Yoon, San Diego, CA (US); Chulmin Jung, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/791,226

(22) Filed: Oct. 23, 2017

(65) Prior Publication Data

US 2018/0046209 A1 Feb. 15, 2018

Related U.S. Application Data (62) Division of application No. 14/684,128, filed on Apr. 10, 2015, now Pat. No. 9,851,730.

(51) Int. Cl.
*G05F 1/10* (2006.01)
*G06F 1/32* (2006.01)
*H02M 1/32* (2007.01)

(52) U.S. Cl.
CPC ............. *G05F 1/10* (2013.01); *G06F 1/329* (2013.01); *G06F 1/3287* (2013.01); *H02M 1/32* (2013.01)

(58) Field of Classification Search
CPC ... H02M 2001/0032; H02M 1/32; G05F 1/10; G05F 1/465; G06F 21/81; G06F 1/26; G06F 1/32–1/3296
See application file for complete search history.

(56) References Cited

U.S. PATENT DOCUMENTS 5,841,313 A  11/1998 Levin et al.
5,910,690 A  6/1999 Dorsey et al.
(Continued)

FOREIGN PATENT DOCUMENTS

DE  102005032294 A1  1/2007
WO  2011017463 A1  2/2011
WO  2013126611 A1  8/2013

OTHER PUBLICATIONS

International Search Report and Written Opinion—PCT/US2016/021835—ISA/EPO—dated Jun. 22, 2016, 11 pages.

*Primary Examiner* — Gustavo Rosario Benitez
(74) *Attorney, Agent, or Firm* — Qualcomm Incorporated-Toler (57) ABSTRACT

A computer-readable storage medium for controlling voltage droop storing instructions that, when executed by a processor, cause a device to perform operations including receiving a first voltage to a first input of a first component of a device. The first voltage corresponding to a first logical value causes a first internal power supply of the first component to be charged using an external power supply. The operations further include providing a second voltage to a second input of a second component of the device in response to a first voltage level of the first internal power supply satisfying a second voltage level. The second voltage corresponding to the first logical value causes a second internal power supply of the second component of the device to be charged using the external power supply.

19 Claims, 8 Drawing Sheets (56) References Cited

U.S. PATENT DOCUMENTS

| | | | |
|---|---|---|---|
| 6,000,829 A * | 12/1999 | Kurokawa | H03K 19/00384 327/121 |
| 6,297,624 B1 * | 10/2001 | Mitsui et al. | G05F 1/46 323/316 |
| 6,426,671 B1 * | 7/2002 | Kono | G05F 5/00 327/512 |
| 7,528,506 B2 | 5/2009 | Lemke | |
| 8,102,205 B2 | 1/2012 | Pletcher et al. | |
| 2006/0235630 A1 * | 10/2006 | Ito et al. | G06F 1/3203 702/57 |
| 2007/0055896 A1 | 3/2007 | Er et al. | |
| 2008/0272809 A1 | 11/2008 | Idgunji et al. | |
| 2009/0184700 A1 | 7/2009 | Kanayama | |
| 2010/0165721 A1 | 7/2010 | Shin | |
| 2011/0205680 A1 | 8/2011 | Kidd et al. | |
| 2011/0241423 A1 | 10/2011 | Bridges et al. | |
| 2013/0043922 A1 | 2/2013 | Srivastava | |
| 2013/0191656 A1 | 7/2013 | Ahmad et al. | |
| 2013/0249519 A1 | 9/2013 | Zhao et al. | |
| 2015/0067361 A1 | 3/2015 | Rusu et al. | |
| 2015/0070056 A1 | 3/2015 | Tanadi | |
| 2015/0326119 A1 | 11/2015 | Hung et al. | |
| 2015/0338901 A1 | 11/2015 | Petrovic | |
| 2016/0189779 A1 | 6/2016 | Guo et al. | |
| 2016/0299517 A1 | 10/2016 | Patil | |

\* cited by examiner

VOLTAGE DROOP CONTROL

I. CROSS REFERENCE TO RELATED APPLICATIONS

The present application claims priority from and is a divisional application of U.S. patent application Ser. No. 14/684,128 filed Apr. 10, 2015, entitled "VOLTAGE DROOP CONTROL," the content of which is incorporated by reference herein in its entirety.

II. FIELD

The present disclosure is generally related to voltage droop control.

III. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

As computing capabilities increase, power usage may also increase. Power usage may be reduced by deactivating components of an electronic device that are not in use. When components are activated, in-rush conditions may cause a power supply voltage to drop below a target voltage level. The components may be activated sequentially with a delay in between activation of each component. For example, a signal may be passed from a particular component via a chain of inverters to a subsequent component. The chain of inverters may cause the delay between activation of the particular component and activation of the subsequent component. The power supply voltage may partially recover during the delay. The delay is dependent on operating conditions (e.g., voltage, temperature, or both). Under particular operating conditions, the delay may be too short for the power supply voltage to recover to a sufficient level before the subsequent component is activated, and the power supply voltage may drop below the target voltage level upon activation of the subsequent component. Increasing a number of inverters in the chain of inverters so that the delay is long enough to account for a wide range of operating conditions may create unnecessary delay during normal operating conditions.

IV. SUMMARY

In an exemplary aspect, a delay between activation of a first component and activation of a subsequent component may be based on a voltage level of an internal power supply of the first component. The internal power supply may be charged by an external power supply in response to receiving a signal to activate the first component. The first component may output a voltage that causes the subsequent component to be activated when the voltage level of the internal power supply is substantially equal to an external power supply voltage or when the voltage level of the internal power supply is greater than or equal to a particular voltage level.

In a particular aspect, a device includes a first component and a second component. Each of the first component and the second component is coupled to an external power supply. The first component includes a first input, a first internal power supply, and a voltage droop controller. The first input is configured to receive a first input voltage. The first internal power supply is configured to be charged by the external power supply in response to the first input voltage corresponding to a first logical value. The voltage droop controller is configured to output a second voltage corresponding to the first logical value in response to a first voltage level of the first internal power supply satisfying a second voltage level. The second component is configured to receive the second voltage from the voltage droop controller.

In another aspect, a method for controlling voltage droop includes receiving a first voltage at a first input of a first component of a device and charging a first internal power supply of the first component using an external power supply in response to the first voltage corresponding to a first logical value. The method further includes providing a second voltage from a first output of the first component to a second input of a second component of the device. The second voltage corresponding to the first logical value is provided from the first output to the second input in response to a first voltage level of the first internal power supply satisfying a second voltage level. The first logical value of the second voltage causes a second internal power supply of the second component to charge.

In another aspect, a computer-readable storage device for controlling voltage droop storing instructions that, when executed, cause a device to perform operations including providing a first voltage to a first input of a first component of a device. The first voltage corresponding to a first logical value causes a first internal power supply of the first component to be charged using an external power supply. The operations further include providing a second voltage to a second input of a second component of the device in response to a first voltage level of the first internal power supply satisfying a second voltage level. The second voltage corresponding to the first logical value causes a second internal power supply of the second component of the device to be charged using the external power supply.

One particular advantage provided by at least one of the disclosed aspects is that voltage droop may be reduced by controlling a delay between activation of a first component of a device and activation of a second component of the device. The delay may be based on a voltage level of an internal power supply of the first component. The internal power supply may be charged by an external power supply. The delay may enable a voltage of the external power supply to recover to a sufficient level before the second component is activated. A length of the delay may track a charging time of the first component to accommodate a wide range of operating conditions, without being unnecessarily long during normal operating conditions.

Other aspects, advantages, and features of the present disclosure will become apparent after review of the entire application, including the following sections: Brief Description of the Drawings, Detailed Description, and the Claims.

VI. DETAILED DESCRIPTION

Figure 1:
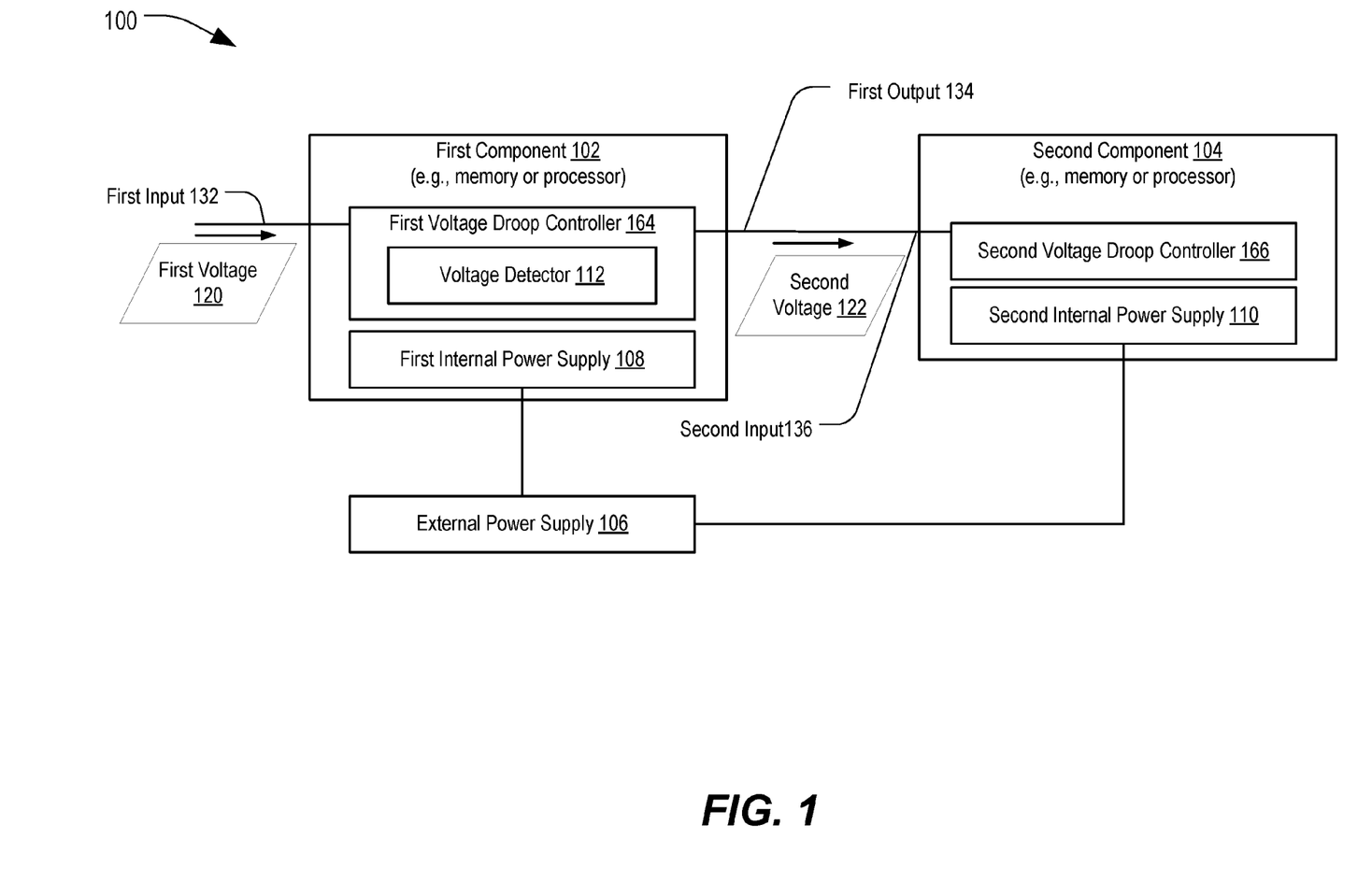
FIG. 1 is a block diagram of a particular illustrative aspect of a device that includes a voltage droop controller.

Referring to FIG. 1, a particular illustrative aspect of a device is disclosed and generally designated 100. For example, the device 100 may include or correspond to at least one of a communications device, a music player, a video player, an entertainment unit, a navigation device, a personal digital assistant (PDA), a mobile device, a computer, a decoder, or a set top box. The device 100 includes a first component 102 coupled to a second component 104. The first component 102, the second component 104, or both, may correspond to a memory component or a processor component. The device 100 includes an external power supply 106 coupled to the first component 102, the second component 104, or both.

The first component 102 includes a first voltage droop controller 164 and a first internal power supply 108. The first voltage droop controller 164 is coupled to a first input 132 that is configured to receive a signal, such as a first voltage 120. The first component 102 may be activated (e.g., powered up) responsive to the first voltage 120 corresponding to a first logical value and may be deactivated (e.g., powered down) responsive to the first voltage 120 corresponding to a second logical value. For purposes of illustration, the first logical value is generally described herein as corresponding to a high voltage (e.g., a "1"), and the second logical value is generally described herein as corresponding to a low voltage (e.g., a "0"). However, such descriptions are merely for illustration and are not limiting.

The first component 102 also includes a first output 134 coupled to a second input 136 of the second component 104. The first output 134 may provide a signal (such as a second voltage 122) to the second input 136 of the second component 104 based on a voltage level of the first internal power supply 108. For example, the first voltage droop controller 164 may include a voltage detector 112 that is coupled to the first internal power supply 108. A logical value of the second voltage 122 may be determined by the first voltage droop controller 164 based on a voltage level of the first internal power supply 108 detected by the voltage detector 112.

The first internal power supply 108 is configured to be charged by the external power supply 106 when the first voltage 120 corresponds to the first logical value. The first internal power supply 108 is not charged by the external power supply 106 when the first voltage 120 corresponds to the second logical value. Additionally, the first voltage droop controller 164 may be configured to set a logical value of the second voltage 122 based on whether a first voltage level of the first internal power supply 108 satisfies a second voltage level (e.g., a target voltage level), as described further below.

The voltage detector 112 may be activated in response to the first input 132 receiving the first voltage 120 corresponding to the first logical value. The voltage detector 112 may generate an output that indicates whether the first voltage level of the first internal power supply 108 is greater than or equal to the second voltage level (e.g., the target voltage level associated with the first component 102). To illustrate, the voltage detector 112 may generate a first output to indicate that the first voltage level satisfies the second voltage level while the first input 132 is receiving the first voltage 120 corresponding to the first logical value. The voltage detector 112 may generate a second output to indicate that the first voltage level fails to satisfy the second voltage level. The voltage detector 112 may also generate the second output when the first input 132 receives the first voltage 120 corresponding to the second logical value.

The first voltage droop controller 164 may be configured to provide the second voltage 122 based on the output of the voltage detector 112, as described further below. For example, the first voltage droop controller 164 may set a value of the second voltage 122 to the first logical value or the second logical value depending on the output of the voltage detector.

The second component 104 may include a second voltage droop controller 166 and a second internal power supply 110. The second voltage droop controller 166 is coupled to the second input 136 and configured to receive the second voltage 122 from the first voltage droop controller 164. The second internal power supply 110 is configured to be charged by the external power supply 106 in response to the second voltage droop controller 166 receiving the second voltage 122 corresponding to the first logical value. The second internal power supply 110 may not be charged by the external power supply 106 while the second voltage 122 corresponds to the second logical value.

Although the device 100 is illustrated as including two components forming a charging sequence. In some implementations, the device 100 may include more than two components in the charging sequence. For example, in some implementations, an output (not illustrated) of the second voltage droop controller 166 may be coupled to another component (e.g., a next component in the charging sequence) of the device 100 to provide another voltage to the next component. In these implementations, a logical value output by the second voltage droop controller 166 via the third voltage may control activation of the next component. To illustrate, the second voltage droop controller 166 may output the third voltage corresponding to the first logical value while the second voltage droop controller 166 is receiving the second voltage 122 corresponding to the first logical value and when a voltage level of the second internal power supply 110 is greater than or equal to a particular voltage level (e.g., a target voltage level associated with the second component 104). Likewise, the second voltage droop controller 166 may output the third voltage corresponding to the second logical value if the second voltage droop controller 166 is receiving the second voltage 122 corresponding to the second logical value or if the voltage level of the second internal power supply 110 is less than the particular voltage level.

During operation, a processor or controller (not illustrated) of the device 100 may send a signal that causes the device 100 to enter a sleep (or standby) mode (e.g., a low-power operating mode). Based on the signal, the first component 102 may receive the first voltage 120, and the first voltage 120 may correspond to the second logical value. Responsive to the first voltage 120 corresponding to the second logical value, one or more components of the device 100 may enter and remain in a sleep mode. When the device 100 is in the sleep mode, the first internal power supply 108 may be decoupled from the external power supply 106 and may discharge (or remain in an uncharged or reduced voltage state). For example, the first voltage droop controller 164 may selectively couple or decouple the first internal power supply 108 to the external power supply 106 based on the logical value of the first voltage 120.

Additionally, the first voltage droop controller 164 may output the second voltage 122 corresponding to the second logical value to the second component 104. The second voltage droop controller 166 may selectively couple or decouple the second internal power supply 110 to the external power supply 106 based on the logical value of the second voltage 122. For example, the second internal power supply 110 may be decoupled from the external power supply 106 and may discharge (or remain in an uncharged or reduced voltage state) when the second voltage 122 corresponds to the second logical value.

The processor or controller (not illustrated) of the device 100 may send a second signal that causes the device 100 to enter an active mode (e.g., a high-power operating mode). For example, the device 100 may transition to the active mode in response to receiving a user input. Based on the second signal, the first voltage droop controller 164 may receive the first voltage 120 corresponding to the first logical value, and the first internal power supply 108 may begin to be charged by the external power supply 106. Due to transitioning from an uncharged or low-voltage state, a first voltage level of the first internal power supply 108 may initially be less than a particular voltage level that indicates a charged or mostly-charged state of the first internal power supply 108 (e.g., a second voltage level). While the first voltage level is less than the second voltage level, the first voltage droop controller 164 may output the second voltage 122 corresponding to the second logical value. As the first internal power supply 108 charges, the first voltage level may rise to be greater than or equal to the second voltage level. The first voltage droop controller 164 may output the second voltage 122 corresponding to the first logical value when the first voltage level is greater than or equal to the second voltage level. When the second voltage droop controller 166 detects that the second voltage 122 corresponds to the first logical value, the second internal power supply 110 may begin to be charged by the external power supply 106.

Thus, the device 100 may reduce voltage droop at the external power supply by delaying activation of the second component 104 until the voltage level of the first internal power supply 108 satisfies a threshold (e.g., the second voltage level). The delay may accommodate a wide range of operating conditions, without being unnecessarily long during normal operating conditions.

The device 100 is illustrated for convenience and the particular illustrated details are not limiting. For example, in other aspects, the device 100 may include more components or fewer components than illustrated in FIG. 1. As another example, operations described as being performed by a particular component of the device 100 may be performed by multiple components of the device 100. Although the first component 102 is described as being activated based on a logical value of the first voltage 120, in other implementations, the first component 102 may be activated based on a different signal, a set of signals, or a different logical value. Similarly, although the second component 104 is described as being activated based on a logical value of the second voltage 122, in other implementations, the second component 104 may be activated based on a different signal, a set of signals, or a different logical value. Further, the first component 102 may be activated based on a different criterion than the second component 104. To illustrate, the first component 102 may be activated when the first voltage 120 corresponds to the first logical value, and the second component 104 may be activated when the second voltage 122 corresponds to the second logical value.

Figure 2:
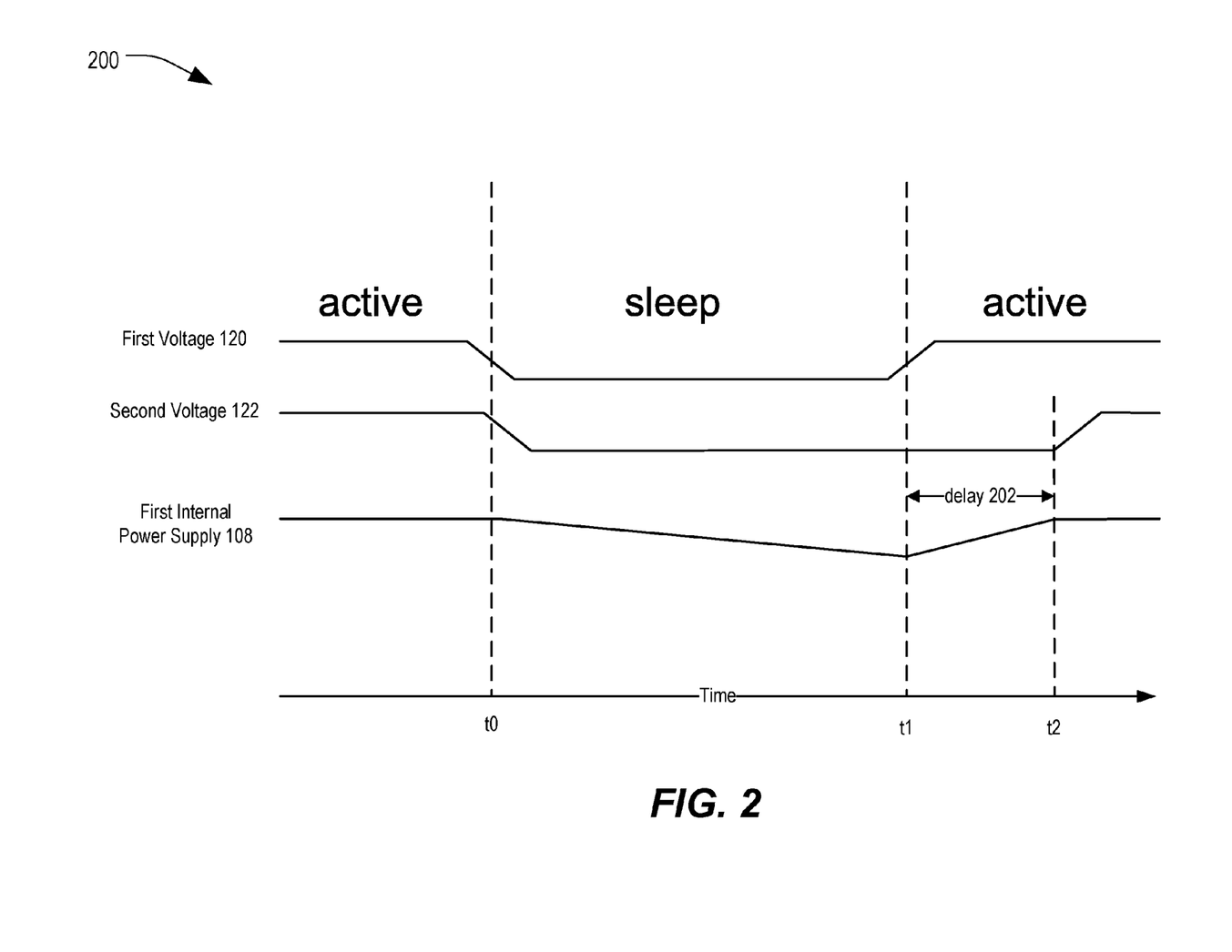
FIG. 2 is a timing diagram corresponding to a particular aspect of operation of the device of FIG. 1.

Referring to FIG. 2, a timing diagram is shown and generally designated 200. In a particular aspect, the timing diagram 200 illustrates operation of the device 100 of FIG. 1. For example, the timing diagram 200 illustrates the first voltage 120, the second voltage 122, and the first voltage level of the first internal power supply 108 at various times during operation of the device 100.

In FIG. 2, the device 100 is in an active mode (e.g., a higher-power mode) prior to a time t0, in a sleep mode (e.g., a lower-power mode) from the time t0 to a time t1, and in the active mode subsequent to the time t1. Additionally, in FIG. 2, the first logical value is represented by a high voltage level, and the second logical value is represented by a low voltage level. For example, the first voltage 120 corresponds to the first logical value when the first voltage 120 is high and corresponds to the second logical value when the first voltage 120 is low. Likewise, in this example, the second voltage 122 corresponds to the first logical value when the second voltage 122 is high and corresponds to the second logical value when the second voltage 122 is low. Thus, in the timing diagram 200, the first voltage 120 corresponds to the first logical value before time t0 and corresponds to the second logical value after the time t0 and before the time t1.

While the first voltage 120 corresponds to the first logical value and the first internal power supply 108 is charged (e.g., has a voltage level greater than or equal to a particular voltage level, such as a voltage level of the external power supply 106), the second voltage 122 output by the first voltage droop controller 164 may correspond to the first logical value. While the second voltage 122 corresponds to the first logical value, the second internal power supply 110 of the second component 104 of FIG. 1 may be charged by the external power supply 106.

When the device 100 enters the sleep mode (e.g., at or about time t0), the first voltage 120 received by the first voltage droop controller 164 may correspond to the second logical value. When the first voltage 120 corresponds to the second logical value, the first internal power supply 108 may be decoupled from the external power supply 106. The first internal power supply 108 may begin to discharge at about the time t0 (e.g., due to leakage currents in the first component 102). Additionally, when the first voltage 120 corresponds to the second logical value, the first output 134 may provide the second voltage 122 corresponding to the second logical value to the second component 104 of FIG. 1. Based on the second voltage 122 corresponding to the second logical value, the second internal power supply 110 of the second component 104 of FIG. 1 may be decoupled from the external power supply 106.

When the device 100 transitions from the sleep mode to the active mode, at or about the time t1, the first voltage 120 may transition from corresponding to the second logical value to corresponding to the first logical value. Based on the first voltage 120 corresponding to the first logical value, the first internal power supply 108 may be coupled to the external power supply 106 to be charged. As the first internal power supply 108 charges, the voltage level of the first internal power supply 108 may increase to the particular voltage level (e.g., at or about the time t2). Based on the voltage level of the first internal power supply 108 satisfying a threshold (e.g., being equal to or greater than the particular voltage level), the second voltage 122 may transition from corresponding to the second logical value to corresponding to the first logical value. Based on the second voltage 122 corresponding to the first logical value, the second internal power supply 110 of the second component 104 of FIG. 1 may be coupled to the external power supply 106 to be charged.

The first voltage droop controller 164 may thus enable a delay 202 between activation of the first component 102 (e.g., at about the time t1 when the first voltage 120 transitions to corresponding to the first logical value) and activation of the second component 104 (e.g., at about the time t2 when the second voltage 122 transitions to corresponding to the first logical value). The delay 202 may enable a voltage of the first internal power supply 108 to recover to a sufficient level before the second component 104 of FIG. 1 begins charging.

Figure 3:
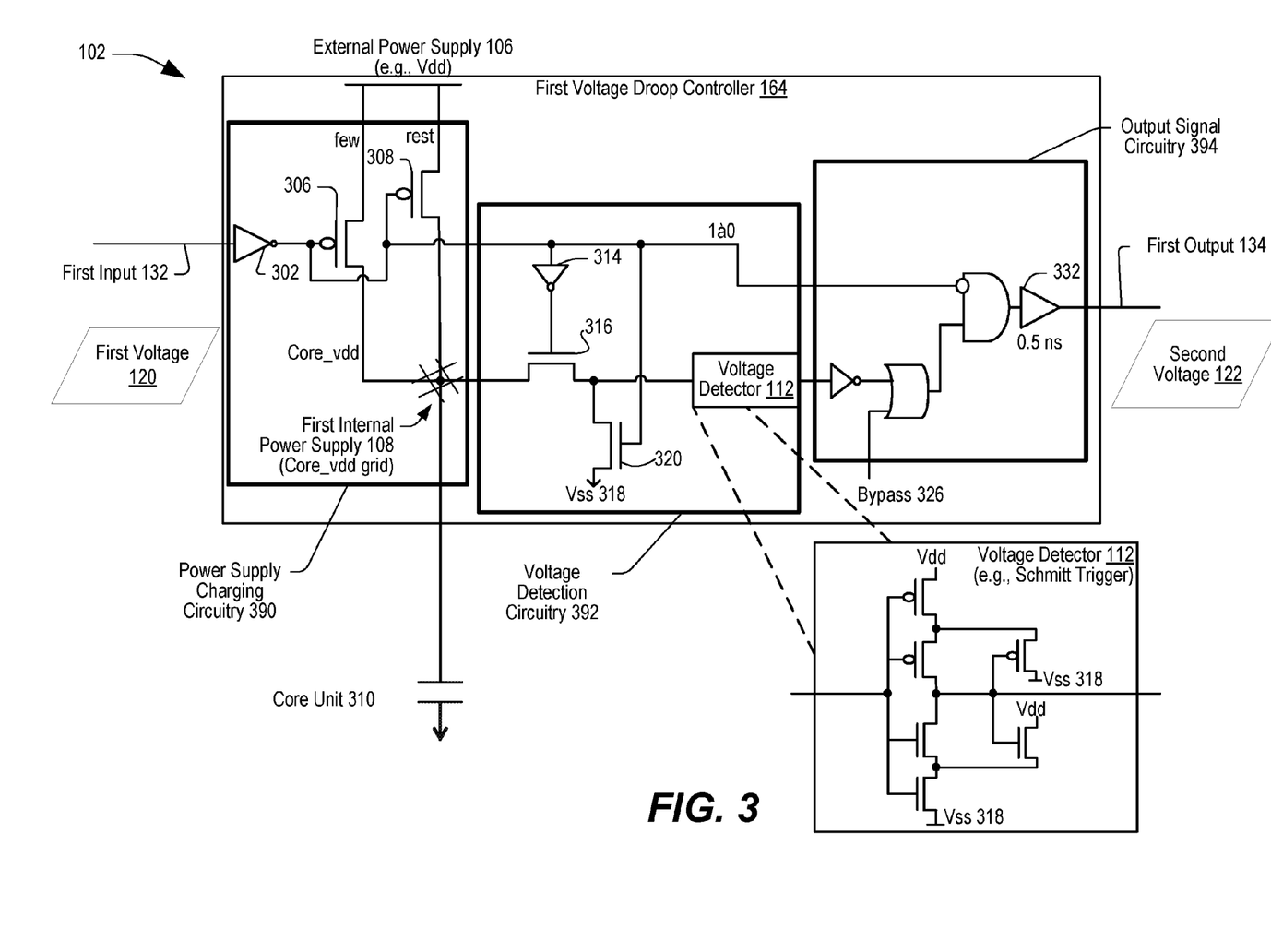
FIG. 3 is a diagram of a particular aspect of a component of the device of FIG. 1.

Referring to FIG. 3, a particular implementation of the first component 102 is shown. The second component 104 of FIG. 1 may include similar circuitry to the circuitry described below with reference to FIG. 3. Thus, the details of various aspects and operations associated with the first component 102 described with reference to FIG. 3 may also apply to the second component 104 or to other components of a charging sequence of the device 100.

In FIG. 3, the first component 102 includes the first voltage droop controller 164 and the first internal power supply 108. The first voltage droop controller 164 includes power supply charging circuitry 390, voltage detection circuitry 392, and output signal circuitry 394. The power supply charging circuitry 390 may be coupled to the first input 132, to the external power supply 106, to the first internal power supply 108, to the voltage detection circuitry 392, and to a core unit 310 (represented by a capacitance in FIG. 3). The voltage detection circuitry 392 may be coupled to the first internal power supply 108 and to the output signal circuitry 394. The output signal circuitry 394 may be coupled, via the first output 134, to a second component (not illustrated), such as the second component 104 of FIG. 1.

In a particular aspect, the first voltage droop controller 164 includes a set of 'header' transistors to couple the first internal power supply 108 to the external power supply 106. For example, in FIG. 3, the power supply charging circuitry 390 includes a first transistor 306 (e.g., a p-channel field-effect transistor (PFET)) and a second transistor 308. Gates of the first transistor 306 and the second transistor 308 may be coupled to the first input 132 via an inverter 302. The first transistor 306, the second transistor 308, or both, may have a source that is coupled to the external power supply 106. A drain of the first transistor 306, the second transistor 308, or both, may be coupled, via the first internal power supply 108 (e.g., a core_vdd grid), to the core unit 310. In FIG. 3, when the first transistor 306, the second transistor 308, or both, are activated, the core unit 310 is electrically connected to the external power supply 106 to enable charging of the core unit 310.

In a particular aspect, the power supply charging circuitry 390 may be configured to have a delay between a first time at which the first transistor 306 (or a first set of header transistors) is activated and a second time at which the second transistor 308 (or second set of header transistors) is activated. The delay may reduce voltage droop of the external power supply 106 as compared to a voltage droop caused by the second transistor 308 being activated at the same time as the first transistor 306. The first transistor 306 may have different characteristics (such as resistance, a threshold voltage, etc.) than the second transistor 308. Additionally, although only two header transistors are illustrated in FIG. 3, the power supply charging circuitry 390 may include more than two header transistors.

The voltage detection circuitry 392 in FIG. 3 includes an inverter 314, a third transistor 320 (e.g., an n-channel field-effect transistor (NFET)), a fourth transistor 316 (e.g., a passgate NFET), and a voltage detector 112 (e.g., a Schmitt trigger). The third transistor 320 has a source coupled to a power supply (Vss) 318. The third transistor is configured to operate as a pull-down device coupled to an input of the voltage detector 112 and responsive to the output of the inverter 302. The fourth transistor 316 is responsive to the output of the inverter 314 to selectively connect or disconnect the first internal power supply 108 to the input of the voltage detector 112.

The output of the inverter 302 may be coupled to the third transistor 320 to selectively activate the third transistor 320. While the third transistor 320 is activated, the input of the voltage detector 112 is discharged or coupled to a ground voltage (e.g., to Vss 318). While the third transistor 320 is deactivated, the fourth transistor 316 may selectively connect the first internal power supply 108 to the input of the voltage detector 112. The voltage detector 112 may be configured to indicate whether a voltage at the input of the voltage detector 112 is greater than or equal to a particular voltage level (e.g., 0.75 volts). For example, the voltage detector 112 may be configured to output a voltage corresponding to a particular logical value (e.g., 0) to indicate that the input of the voltage detector 112 is greater than or equal to the particular voltage level (e.g., a target voltage) and to output a voltage corresponding to a second particular logical value (e.g., 1) to indicate that the input of the voltage detector 112 is less than the particular voltage level. In a particular aspect, the voltage detector 112 is configured to compare the input of the voltage detector 112 to multiple different target voltages (such as a high target voltage and low target voltage) to reduce erroneous outputs due to noise at the input. For example, the voltage detector 112 may be configured to continue to output the first logical value as the input to the voltage detector 112 falls from at or above the high target voltage to the low target voltage and to output the second logical value when the input falls below the low target voltage. As another example, the voltage detector 112 may be configured to continue to output the second logical value as the input to the voltage detector 112 rises from below the low target voltage to the high target voltage and to output the first logical value when the input rises above the high target voltage.

The output signal circuitry 394 includes output selection circuitry (such as an inverter, an OR gate, and an AND gate) and a delay buffer 332. An output of the delay buffer 332 may be coupled to the first output 134. The output signal circuitry 394 may also include a bypass input 326, which may be used to bypass (e.g., override) the functionality of the voltage detection circuitry 392.

There may be a delay between a change in the input of the delay buffer 332 and a corresponding change in the output (e.g., the first output 134) of the delay buffer 332. The delay of the delay buffer 332 may function as a threshold (e.g., minimum) delay between receiving a change in the logical value of the first voltage 120 and a change in the in the logical value of the second voltage 122.

During operation, the first voltage 120 may correspond to the second logical value (e.g., a "0" value) during operation in a sleep mode (e.g., a low-power operating mode) and may correspond to the first logical value (e.g., a "1" value) during operation in the active mode. When the first voltage 120 transitions to correspond to the second logical value (e.g., when the sleep mode is activated), the first internal power supply 108 is decoupled from the external power supply 106 (e.g., by the first and second transistors 306, 308) and may be allowed to discharge. The output of the inverter 302 may deactivate the fourth transistor 316 to isolate the first internal power supply 108 from the voltage detector 112, and the voltage detector 112 may output a voltage corresponding to the first logical value (e.g., a 1). The output selection circuitry of the output signal circuitry 394 may provide the second logical value (e.g., a 0) to the delay buffer 332, and, after the minimum delay, the second voltage 122 may transition to correspond to the second logical value.

When the first voltage 120 transitions to correspond to the first logical value (e.g., when the active mode is activated), the first transistor 306, the second transistor 308, or both, may be activated to couple the first internal power supply 108 to the external power supply 106. Additionally, the fourth transistor 316 may be activated, and the third transistor 320 may be deactivated. Thus, the first internal power supply 108 may be connected to the input of the voltage detector 112.

When the voltage at the input to the voltage detector 112 is approximately equal to or greater than the particular voltage level (e.g., a first target voltage, such as the high target voltage), the output of the voltage detector 112 may transition from the first logical value (e.g., a 1) to the second logical value (e.g., a 0), causing the output selection circuitry to provide a voltage corresponding to the first logical value (e.g., a 1) to the delay buffer 332. After a particular time delay (e.g., 0.5 nanoseconds), the second voltage 122 transitions from the second logical value (e.g., a 0) to the first logical value (e.g., a 1). The first voltage droop controller 164 of FIG. 3 may thus generate a delay between activation of the first component 102 and providing an output to cause activation of a next component in a charging sequence.

Figure 4:
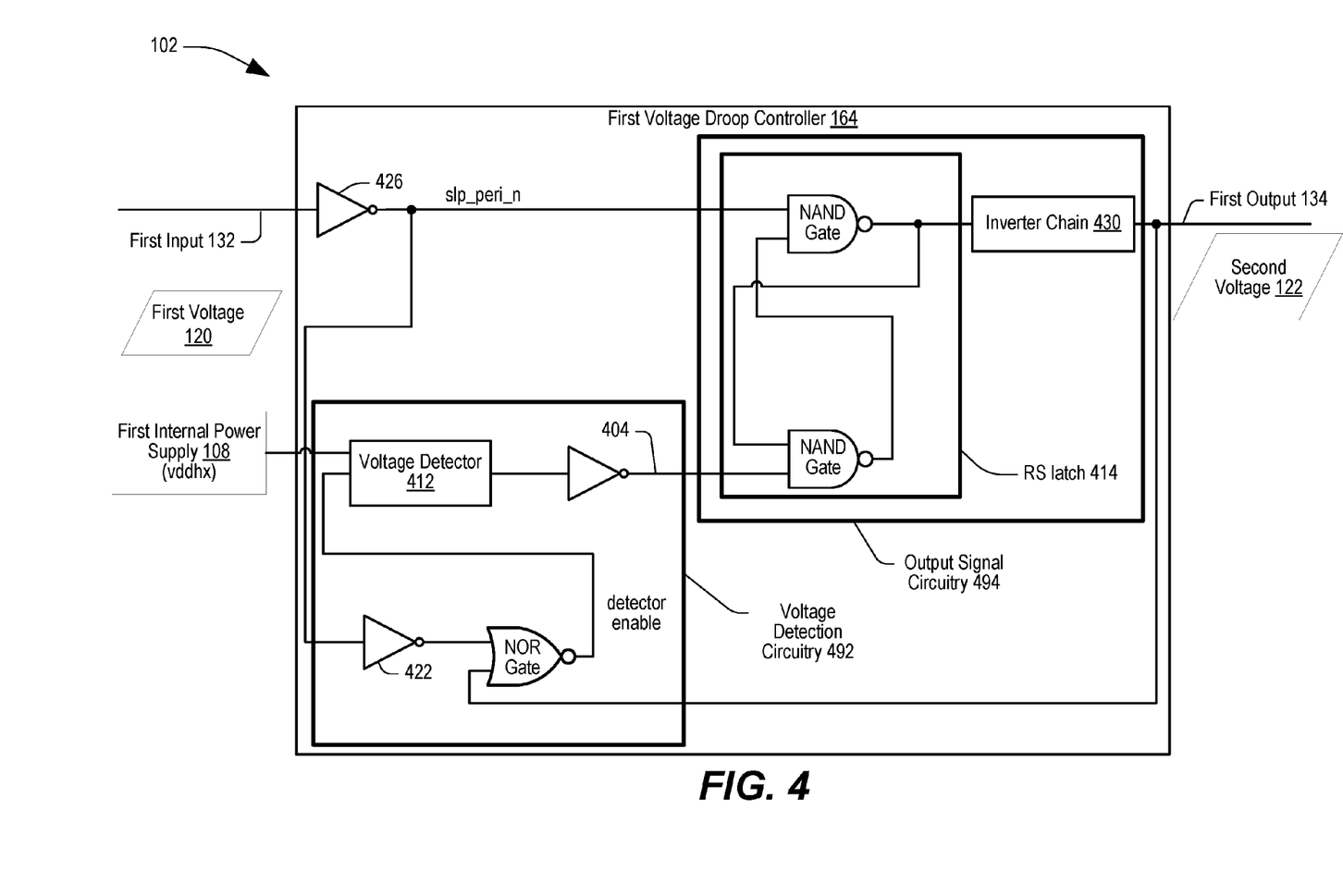
FIG. 4 is a diagram of another particular aspect of the component of the device of FIG. 1.

Referring to FIG. 4, another particular implementation of the first component 102 is shown. The second component 104 of FIG. 1 may include similar circuitry to the circuitry described below with reference to FIG. 4. Thus, the details of various aspects and operations associated with the first component 102 described with reference to FIG. 4 may also apply to the second component 104 or to other components of a charging sequence of the device 100.

In FIG. 4, the first component 102 includes the first voltage droop controller 164. The first voltage droop controller 164 includes an inverter 426 coupled to the first input 132 and coupled to voltage detection circuitry 492 and to output signal circuitry 494. The voltage detection circuitry 492 generates an output 404 based on a voltage level of the first internal power supply 108 and based on an output of the inverter 426. The output signal circuitry 494 is responsive to the output of the inverter 426 and to the output 404 of the voltage detection circuitry 492 to generate the first output 134.

Logic (e.g., an inverter 422 and a NOR gate in FIG. 4) of the voltage detection circuitry 492 may provide a detector enable signal to a voltage detector 412 based on a logical value of the first voltage 120. The voltage detector 412 may correspond to the voltage detector 112 of FIG. 1, and is described in more detail with reference to FIG. 5. The voltage detector 412 may be coupled to the first internal power supply 108 (vddhx). While activated (based on the detector enable signal), the voltage detector 412 may provide an output to the output signal circuitry 494 indicating whether a first voltage of first internal power supply 108 satisfies (e.g., is greater than or equal to) a second voltage of the external power supply 106 (vddmx) (e.g., a power rail).

The output signal circuitry 494 may include a reset-set (RS) latch 414 and a chain of inverters (inverter chain 430). A delay generated by the inverter chain 430 may function as a threshold (e.g., minimum) delay between activation of the first component 102 (e.g., responsive to the first voltage 120) and generating the second voltage 122 corresponding to the first logical value. The first voltage droop controller 164 of FIG. 4 may thus generate a delay between activation of the first component 102 and providing an output to cause activation of a next component in a charging sequence.

Figure 5:
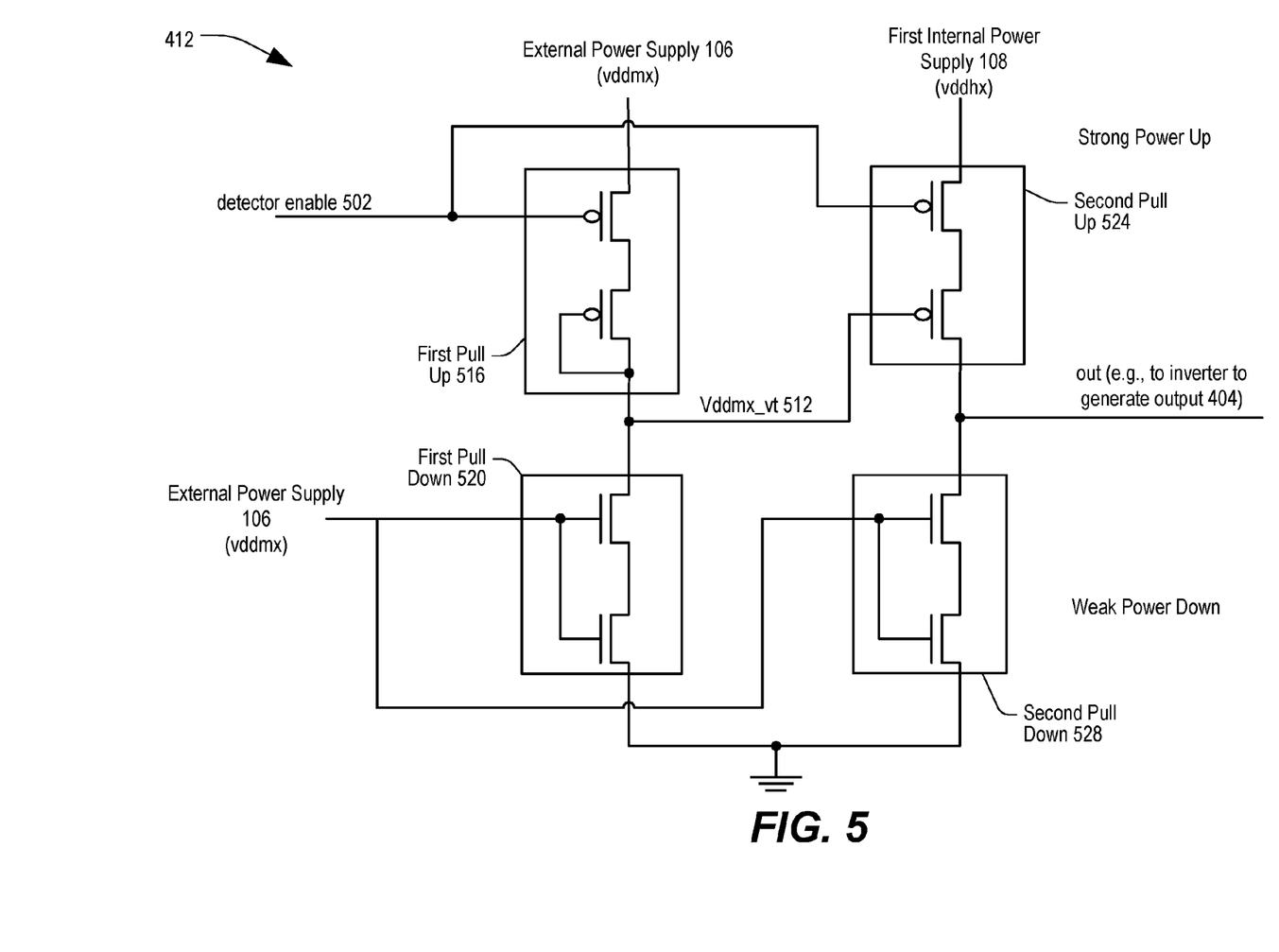
FIG. 5 is a diagram of a particular aspect of a voltage detector of the device of FIG. 1.

Referring to FIG. 5, a particular aspect of the voltage detector 412 of FIG. 4 is disclosed. In FIG. 5, the voltage detector 412 includes first pull up circuitry 516 and second pull up circuitry 524, which are configured to receive a detector enable signal 502. The detector enable signal 502 may correspond to the detector enable signal of FIG. 4. The voltage detector 412 also includes first pull down circuitry 520 and second pull down circuitry 528 coupled to receive a voltage from the external power supply 106 (vddmx).

The first pull up circuitry 516 and the first pull down circuitry 520 are configured to operate as a first inverter responsive to the detector enable signal 502 and to the external power supply 106. An output 512 (Vddmx_vt) of the first inverter may be provided as input to the second pull up circuitry 524. The second pull up circuitry 524 and the second pull down circuitry 528 are configured to operate as a second inverter responsive to the detector enable signal 502, the output 512 of the first inverter and the external power supply 106. When a voltage differential between the first internal power supply 108 and the output 512 of the first inverter is sufficient, a state of the output of the second inverter changes (e.g., from the second logical value to the first logical value). Thus, the voltage detector 412, when activated, may indicate whether a first voltage level of the first internal power supply 108 satisfies a target voltage level (e.g., is approximately equal to a second voltage level of the external power supply 106).

Figure 6:
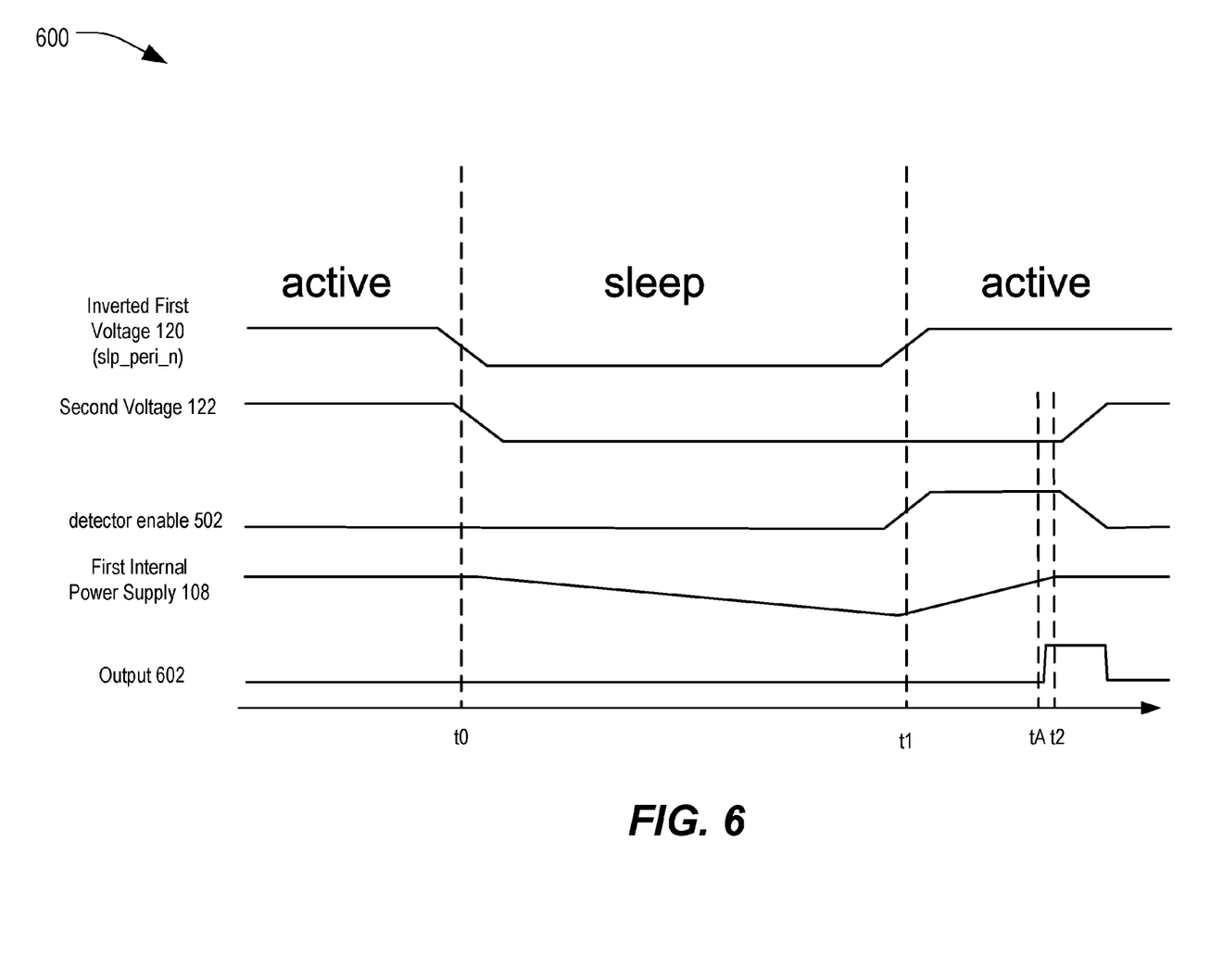
FIG. 6 is a timing diagram corresponding to a particular aspect of operation of the device of FIG. 1.

Referring to FIG. 6, a timing diagram is disclosed and generally designated 600. The timing diagram 600 may differ from the timing diagram 200 of FIG. 2 in that the timing diagram 600 illustrates exemplary values of the detector enable signal 502 and an output signal 602 of the voltage detector 412. As in the timing diagram 200 of FIG. 2, the device 100 of FIG. 1 may be in an active mode (e.g., a high-power operating mode) prior to a time t0, in a sleep mode (e.g., a low-power operating mode) from the time t0 to a time t1, and in the active mode subsequent to the time t1.

At the time t1, the inverted first voltage 120 transitions from corresponding to the second logical value to corresponding to the first logical value. The detector enable signal 502 may activate the voltage detector 412 based on the first voltage 120 transitioning to corresponding to the first logical value. Additionally, the first internal power supply 108 may begin to charge using the external power supply 106 based on the first voltage 120 transitioning to corresponding to the first logical value. The output signal 602 may have the second logical value (e.g., 0) while the voltage level of the first internal power supply 108 is less than a target voltage level (e.g., the voltage level of the external power supply 106).

At or about a time tA, the first voltage level of the first internal power supply 108 may satisfy (e.g., be approximately equal to) the target voltage level, and the output signal 602 may transition to corresponding to the first logical value (e.g., 1). After a delay (e.g., at or about the time t2), the second voltage 122 (corresponding to the first output 134 of FIG. 1) may begin to transition to corresponding to the first logical value (e.g., 1). The delay between tA and t2 may be due, at least in part, to latching at the RS latch 414 and delay of inverter chain 430 of FIG. 4.

The detector enable signal 502 may subsequently transition to corresponding to the second logical value (e.g., 0) to disable the voltage detector 412 in response to the first output 134 transitioning to corresponding to the first logical value.

Figure 7:
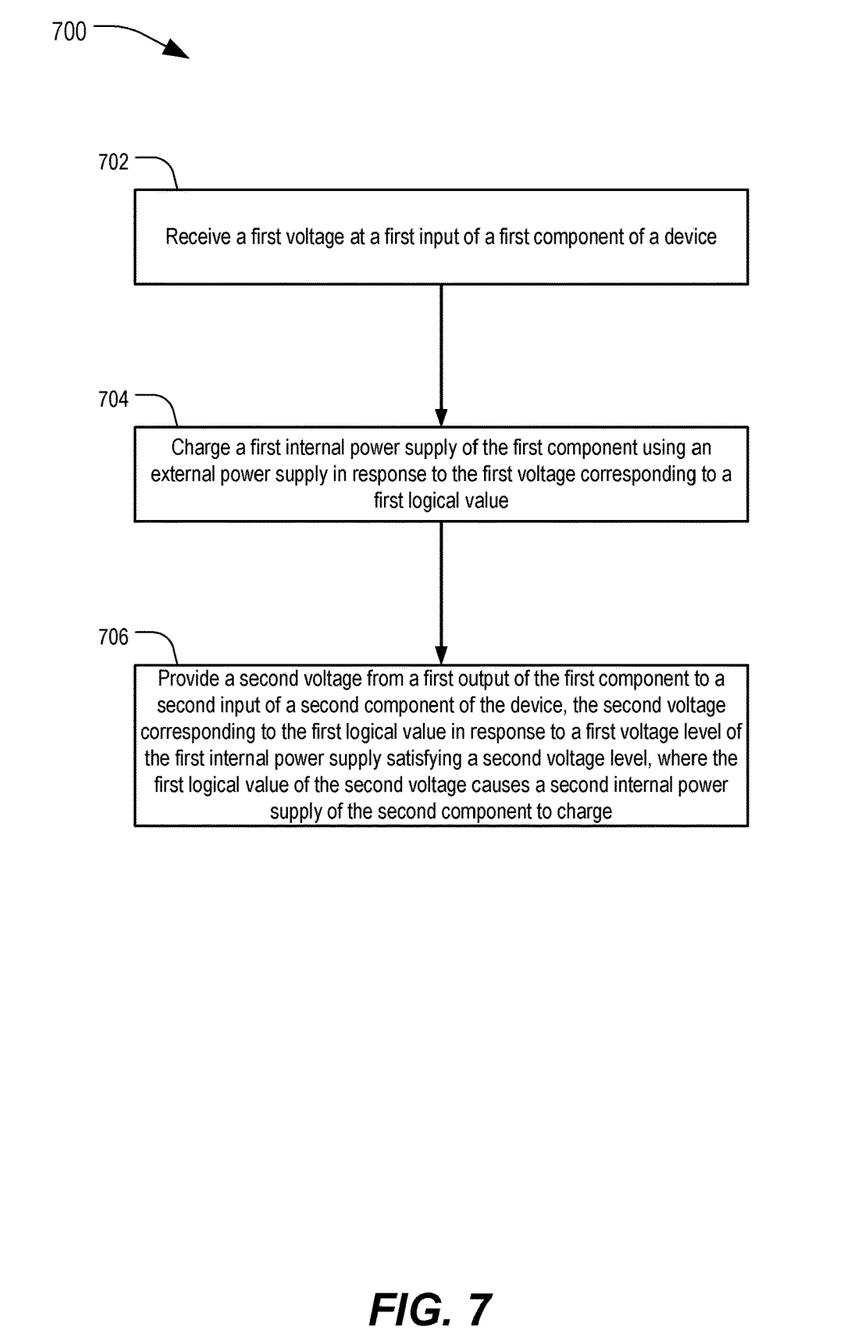
FIG. 7 is a flow chart of a particular aspect of a method of operation of the device of FIG. 1.

Referring to FIG. 7, a particular aspect of a method of operation is shown and generally designated 700. In a particular aspect, the method 700 may be performed by the device 100, the first component 102, the second component 104, the first voltage droop controller 164, the second voltage droop controller 166, the voltage detector 112 of FIG. 1, the voltage detector 412 of FIG. 4, or a combination thereof.

The method 700 includes receiving a first voltage at a first input of a first component of a device, at 702. For example, the first component 102 of the device 100 may receive the first voltage 120, as described with reference to FIG. 1.

A first internal power supply of the first component is charged using an external power supply in response to the first voltage corresponding to a first logical value, at 704. For example, the external power supply 106 may charge the first internal power supply 108 of the first component 102 in response to the first voltage 120 corresponding to the first logical value, as described with reference to FIG. 1.

A second voltage corresponding to the first logical value is provided from the first component to a second component of the device in response to a first voltage level of the first internal power supply satisfying a second voltage level, at 706. For example, the first component 102 of FIG. 1 may provide the second voltage 122 corresponding to the first logical value to the second component 104 of the device 100 in response to a first voltage level of the first internal power supply 108 satisfying a second voltage level, as described with reference to FIG. 1.

A second internal power supply of the second component of the device may be charged using the external power supply in response to the second component receiving the second voltage corresponding to the first logical value from the first component. For example, the external power supply 106 of FIG. 1 may charge the second internal power supply 110 of the second component 104 of the device 100 in response to the second voltage 122 corresponding to the first logical value. The method 700 may thus enable generation of a delay between activation of the first component and providing a signal to activate the second component.

Figure 8:
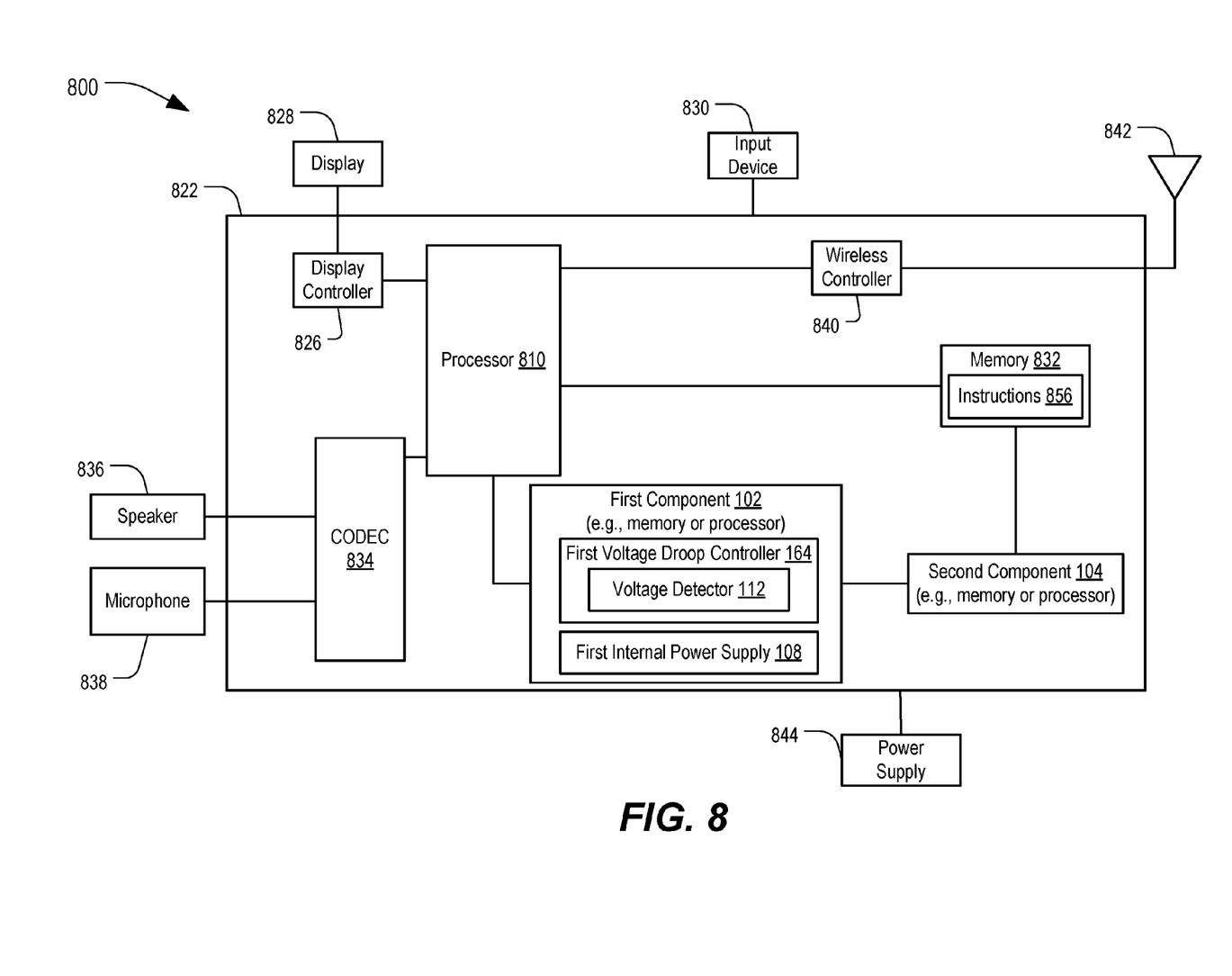
FIG. 8 is a block diagram of a device that is operable to support various aspects of one or more methods, systems, apparatuses, and computer-readable media disclosed herein.

Referring to FIG. 8, a block diagram of a particular illustrative aspect of a communication device is depicted and generally designated 800. The device 800 includes a processor 810 (e.g., a digital signal processor (DSP)) coupled to a memory 832. The processor 810 may be coupled to (or include) the first component 102, the second component 104, or both. Alternatively, or additionally, the memory 832 may be coupled to (or include) the first component 102, the second component 104, or both. In a particular aspect, one or more components of the device 800 may perform one or more operations described with reference to systems and methods of FIGS. 1-7.

The memory 832 may be a non-transient computer readable medium storing computer-executable instructions 856 that are executable by the processor 810 to cause the processor 810 to control voltage droop of the external power supply 106 of FIG. 1 during transition from a low power state (e.g., a sleep mode) to a higher power state (e.g., an active mode). For example, the instructions may be executable by the processor 810 to cause the first voltage 120 of FIG. 1 to correspond to the first logical value, such that first component 102 provides the second voltage 122 corresponding to the first logical value to the second component 104 when a voltage level of the first internal power supply 108 satisfies a target voltage, as described above. The external power supply 106 of FIG. 1 may correspond to the power supply 844 of FIG. 8.

FIG. 8 also indicates that a wireless controller 840 can be coupled to the processor 810 and to an antenna 842. In a particular aspect, the processor 810, a display controller 826, the memory 832, a CODEC 834, and the wireless controller 840 are included in a system-in-package or system-on-chip device 822. In a particular aspect, an input device 830 and the power supply 844 are coupled to the system-on-chip device 822. Moreover, in a particular aspect, as illustrated in FIG. 8, a display 828, the input device 830, a speaker 836, a microphone 838, the antenna 842, and the power supply 844 are external to the system-on-chip device 822. However, each of the display 828, the input device 830, the speaker 836, the microphone 838, the antenna 842, and the power supply 844 can be coupled to a component of the system-on-chip device 822, such as an interface or a controller.

In conjunction with the described aspects, an apparatus includes means for controlling voltage droop at a first component of a device configured to receive a first voltage at a first input of the first component, to charge a first internal power supply of the first component using an external power supply in response to the first voltage corresponding to a first logical value, and to provide a second voltage corresponding to the first logical value from a first output of the first component to a second input of a second component of the device in response to a first voltage level of the first internal power supply satisfying a second voltage level. For example, the means for controlling voltage droop at the first component may include the first voltage droop controller 164 of FIGS. 1, 3, 4 and 8, the first component 102 of FIGS. 1 and 8, the device 100 of FIG. 1, the device 800 of FIG. 8, one or more other devices, circuits, modules, or instructions configured to receive a first voltage at a first input of the first component, to charge a first internal power supply of the first component using an external power supply in response to the first voltage corresponding to a first logical value, and to provide a second voltage corresponding to the first logical value from a first output of the first component to a second input of a second component of the device in response to a first voltage level of the first internal power supply satisfying a second voltage level, or a combination thereof.

The apparatus also includes means for controlling voltage droop at the second component configured to charge a second internal power supply of the second component using the external power supply in response to the second voltage corresponding to the first logical value. For example, the means for controlling voltage droop at the second component may include the second voltage droop controller 166 of FIG. 1, the second component 104 of FIGS. 1 and 8, the device 100 of FIG. 1, the device 800 of FIG. 8, one or more other devices, circuits, modules, or instructions configured to charge a second internal power supply of the second component using the external power supply in response to the second voltage corresponding to the first logical value, or a combination thereof.

The apparatus may also include means for introducing a delay between a time of determining that the first voltage level of the first internal power supply satisfies the second voltage level and a second time of providing the second voltage corresponding to the first logical value to the second component. For example, the means for introducing the delay may include the delay buffer 332 of FIG. 3, the output signal circuitry 394 of FIG. 3, the inverter chain 430 of FIG. 4, the output signal circuitry 494 of FIG. 4, the device 100 of FIG. 1, the device 800 of FIG. 8, one or more other devices, circuits, modules, or instructions configured to introduce a delay between a time of determining that the first voltage level of the first internal power supply satisfies the second voltage level and a second time of providing the second voltage corresponding to the first logical value to the second component, or a combination thereof.

The apparatus may also include means for detecting the first voltage level of the first internal power supply. For example, the means for detecting the first voltage level of the first internal power supply may include the voltage detector 112 of FIGS. 1 and 3, the voltage detector 412 of FIGS. 4 and 5, the voltage detection circuitry 392 of FIG. 3, the voltage detection circuitry 492 of FIG. 4, the device 100 of FIG. 1, the device 800 of FIG. 8, one or more other devices, circuits, modules, or instructions configured to detect the first voltage level of the first internal power supply, or a combination thereof.

Those of skill would further appreciate that the various illustrative logical blocks, configurations, modules, circuits, and algorithm steps described in connection with the aspects disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the aspects disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g. tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A non-transitory computer-readable storage medium for controlling voltage droop, the computer-readable storage medium storing instructions that, when executed by a processor, cause a device to perform operations comprising:
receiving a first voltage to a first input of a first component of the device, wherein the first voltage corresponding to a first logical value causes a first internal power supply of the first component to be charged by an external power supply, wherein the first internal power supply provides an output to an input of a voltage detector in response to the first voltage corresponding to the first logical value, and wherein the input of the voltage detector is coupled to a ground voltage in response to the first voltage corresponding to a second logical value; and
providing a second voltage to a second input of a second component of the device, the second voltage corresponding to the first logical value in response to a first voltage level of the first internal power supply satisfying a second voltage level, wherein the second voltage corresponding to the first logical value causes a second internal power supply of the second component of the device to be charged by the external power supply.

2. The non-transitory computer-readable storage medium of claim 1, wherein execution of the instructions causes the device to perform operations further comprising:
receiving the first voltage corresponding to the second logical value to the first input of the first component, wherein the first voltage corresponding to the second logical value causes the first internal power supply to disconnect from the external power supply; and
providing the second voltage corresponding to the second logical value to the second input of the second component, wherein the second voltage corresponding to the second logical value causes the second internal power supply to disconnect from the external power supply.

3. The non-transitory computer-readable storage medium of claim 1, wherein execution of the instructions causes the device to perform operations further comprising disconnecting the external power supply from the first internal power supply in response to the first voltage corresponding to the second logical value.

4. The non-transitory computer-readable storage medium of claim 1, wherein execution of the instructions causes the device to perform operations further comprising charging the second internal power supply by the external power supply in response to the second voltage corresponding to the first logical value and disconnecting the second internal power supply from the external power supply in response to the second voltage corresponding to the second logical value.

5. The non-transitory computer-readable storage medium of claim 1, wherein execution of the instructions causes the device to perform operations further comprising disconnecting the external power supply from the second internal power supply in response to the second voltage corresponding to a second logical value.

6. The non-transitory computer-readable storage medium of claim 1, wherein execution of the instructions causes the device to perform operations further comprising:
connecting the first internal power supply to the input of the voltage detector in response to the first voltage corresponding to the first logical value, and
disconnecting the first internal power supply from the input of the voltage detector in response to the first voltage corresponding to the second logical value.

7. The non-transitory computer-readable storage medium of claim 1, wherein execution of the instructions causes the device to perform operations further comprising:
decoupling the first internal power supply from the external power supply in response to the first voltage corresponding to the second logical value, and
outputting, via a first output, the second voltage corresponding to the second logical value in response to the first voltage corresponding to the second logical value.

8. The non-transitory computer-readable storage medium of claim 1, wherein execution of the instructions causes the device to perform operations further comprising introducing a delay between a time of determining that the first voltage level of the first internal power supply satisfies the second voltage level and a second time of outputting the second voltage corresponding to the first logical value.

9. The non-transitory computer-readable storage medium of claim 1, wherein execution of the instructions causes the device to perform operations further comprising outputting the second voltage corresponding to the second logical value in response to the first voltage corresponding to the second logical value.

10. The non-transitory computer-readable storage medium of claim 1, wherein charging the first internal power supply includes controlling a rate of charging the first internal power supply.

11. The non-transitory computer-readable storage medium of claim 1, wherein the device further comprises a voltage droop controller configured to output, via a first output, the second voltage corresponding to the second logical value in response to the first voltage corresponding to the second logical value.

12. The non-transitory computer-readable storage medium of claim 1, wherein the device further comprises a voltage droop controller that includes a voltage detector, wherein the input of the voltage detector is coupled to the first internal power supply, and wherein an output of the voltage detector is coupled to a first output.

13. The non-transitory computer-readable storage medium of claim 1, wherein the device further comprises a latch coupled to a first output of a voltage droop controller, wherein the first output is configured to output the second voltage corresponding to the first logical value responsive to an output of the latch having the first logical value.

14. The non-transitory computer-readable storage medium of claim 1, wherein the second internal power supply is distinct from the first internal power supply and distinct from the external power supply, and wherein the second voltage level is a voltage level of the external power supply or a target voltage level.

15. The non-transitory computer-readable storage medium of claim 1, wherein the device further comprises output signal circuitry coupled to an output of the voltage detector, wherein the output signal circuitry is configured to provide the second voltage corresponding to the first logical value to the second component based on the output of the voltage detector and based on the first voltage corresponding to the first logical value.

16. The non-transitory computer-readable storage medium of claim 15, wherein the output signal circuitry includes a delay buffer that causes at least a particular delay between a first time that the first voltage corresponds to the first logical value and a second time that the second voltage corresponds to the first logical value.

17. The non-transitory computer-readable storage medium of claim 15, wherein the output signal circuitry includes an inverter chain that causes at least a particular delay between a first time that the first voltage corresponds to the first logical value and a second time that the second voltage corresponds to the first logical value.

18. The non-transitory computer-readable storage medium of claim 1, wherein the device further comprises a latch coupled to a first output of a voltage droop controller, wherein the first output is configured to output the second voltage corresponding to the first logical value responsive to an output of the latch having the first logical value.

19. The non-transitory computer-readable storage medium of claim 1, wherein the device further comprises:
a first transistor including a first gate operatively coupled to the first input, a first source operatively coupled to the external power supply, and a first drain operatively coupled to the first internal power supply; and
a second transistor including a second gate operatively coupled to the first input and a second drain operatively coupled to the first internal power supply, wherein the second transistor is configured to provide current to the first internal power supply from the external power supply after a delay of time after the first transistor provides current to the first internal power supply to control a rate of charging of the first internal power supply.

* * * * *